US007085377B1

(12) United States Patent  (10) Patent No.: US 7,085,377 B1
Norr  (45) Date of Patent: Aug. 1, 2006

(54) INFORMATION DELIVERY IN A MULTI-STREAM DIGITAL BROADCASTING SYSTEM

(75) Inventor: William M. Norr, Flemington, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/364,432

(22) Filed: Jul. 30, 1999

(51) Int. Cl.
 *H04K 1/02* (2006.01)
(52) U.S. Cl. .................. 380/37; 370/485; 370/486; 370/487; 713/181
(58) Field of Classification Search ............. 380/37, 380/210, 255; 713/163, 165, 166, 167, 201, 713/181; 455/135; 348/14.12, 92; 702/84; 725/30, 87; 705/50, 51; 370/480, 485–487; 726/2, 21
See application file for complete search history.

(56) References Cited

U.S. PATENT DOCUMENTS

| | | | | |
|---|---|---|---|---|
| 3,580,989 | A | * | 5/1971 | Banning, Jr. .............. 380/211 |
| 4,494,142 | A | * | 1/1985 | Mistry ..................... 380/241 |
| 5,173,900 | A | * | 12/1992 | Miller et al. .............. 370/349 |
| 5,267,021 | A | * | 11/1993 | Ramchandran et al. ..... 348/469 |
| 5,740,246 | A | * | 4/1998 | Saito ....................... 705/52 |
| 5,751,806 | A | * | 5/1998 | Ryan ........................ 380/9 |
| 5,818,934 | A | * | 10/1998 | Cuccia ...................... 380/9 |
| 5,909,238 | A | * | 6/1999 | Nagashima et al. ......... 725/8 |
| 5,949,796 | A | * | 9/1999 | Kumar ..................... 370/529 |
| 6,026,164 | A | * | 2/2000 | Sakamoto et al. .......... 380/217 |
| 6,041,068 | A | * | 3/2000 | Rosengren et al. ......... 370/538 |
| 6,370,507 | B1 | * | 4/2002 | Grill et al. ................ 704/500 |
| 6,385,596 | B1 | * | 5/2002 | Wiser et al. ............... 705/51 |
| 6,405,338 | B1 | * | 6/2002 | Sinha et al. ............... 714/752 |
| 6,434,746 | B1 | * | 8/2002 | Nagashima et al. ......... 725/5 |
| 6,445,693 | B1 | * | 9/2002 | Sarraf et al. ............... 370/343 |
| 6,529,526 | B1 | * | 3/2003 | Schneidewend ............ 370/486 |

FOREIGN PATENT DOCUMENTS

| | | |
|---|---|---|
| EP | 0 917 367 A1 | 5/1999 |
| EP | 0 918 408 A2 | 5/1999 |
| EP | 00 30 6081 | 4/2005 |

OTHER PUBLICATIONS

Menezes et al, Handbook of Applied Cryptography, 1997, pp. 20.*

(Continued)

*Primary Examiner*—Kim Vu
*Assistant Examiner*—Thomas Gyorfi (57) ABSTRACT

Audio or other information is delivered to a user via a multi-stream digital broadcasting system in a partially-encrypted form. The information is encoded and separated into multiple bitstreams, at least a subset of which are left unencrypted. Both the encrypted and unencrypted bitstreams are received and stored by the user. A user is able, for at least a limited period of time, to access the information at a first quality level, e.g., an FM-quality level for audio information, without having the corresponding decryption key, by utilizing only the unencrypted bitstreams. The user can then access an electronic-commerce web site to purchase the decryption key. The key may be downloaded from the site to an information processing device of the user, and may be utilized to decrypt the partially-encrypted format, such that the user is provided with access to the information at a second quality level higher than the first quality level, e.g., a CD-quality level for audio information. The multiple bitstreams may correspond, e.g., to subbands of at least first and second digital sidebands of a host carrier signal in an FM in-band on-channel (FM-IBOC) digital audio broadcasting system.

38 Claims, 7 Drawing Sheets

OTHER PUBLICATIONS

Sinha et al, Unuqual Error Preotection Methods for Perceptual Audio Coders, 1999 IEEE International conference on vol. 5, pp. 2423-2426.*

P. Kafka, "Play it Again," http://www.forbes.com, Jul. 1999.

J.R. Garber, "Albums and Alpo," http://www.forbes.com, Jul. 1999.

D. Sinha, J.D. Johnston, S. Dorward and S.R. Quackenbush, "The Perceptual Audio Coder," in Digital Audio, Section 42, pp. 42-1 to 42-18, CRC Press, 1998.

B.W. Kroeger and A.J. Vigil, "Improved IBOC DAB Technology for AM and FM Broadcasting," SBE Engineering Conference, pp. 1-10, 1996.

B.W. Kroeger and D. Cammarata, "Robust Modem and Coding Techniques for FM Hybrid IBOC DAB," IEEE Transactions on Broadcasting, vol. 43, No. 4, pp. 412-420, Dec. 1997.

B.W. Kroeger and P.J. Peyla, "Compatibility of FM Hybrid In-Band On-Channel (IBOC) System for Digital Audio Broadcast," IEEE Transactions on Broadcastig, vol. 43, No. 4, pp. 421-430, Dec. 1997.

* cited by examiner

INFORMATION DELIVERY IN A
MULTI-STREAM DIGITAL BROADCASTING
SYSTEM

FIELD OF THE INVENTION

The present invention relates generally to digital audio broadcasting (DAB) and other types of digital communication systems, and more particularly to techniques for delivering information to users over a DAB system or other type of communication system.

BACKGROUND OF THE INVENTION

Existing electronic commerce applications allow users to make purchases of various types of information-related products over computer networks such as the Internet. For example, a user can typically purchase a software package over the Internet by accessing a corresponding web site, providing the necessary payment information, e.g., a valid credit card number, and downloading the software from the site. In such applications, the software may be transmitted to the user in an at least partially-encrypted format, so as to prevent unauthorized distribution and use of the software. An authorized user is then subsequently provided with a decryption "key" which allows the software to be decrypted and used. Similar techniques may be used to purchase and download music or other audio information, e.g., "singles," compilations such as compact disks (CDs), live broadcasts, interviews, talking books, etc. over the Internet. A well-known conventional format for downloadable audio information of this type is the MPEG-1 Level 3 Digital Audi Standard, also referred to as MP3.

A significant problem with the above-noted conventional techniques as applied to the transfer of music or other audio information to authorized users is that it can often take an unduly long amount of time to download such information over existing networks. Moreover, the music is in many cases already delivered repeatedly to the same users over other channels, e.g., through broadcast air waves.

For example, proposed systems for providing digital audio broadcasting (DAB) in the FM radio band are expected to provide near CD-quality audio, data services, and more robust coverage than existing analog FM transmissions. However, until such time as a transition to all-digital DAB can be achieved, many broadcasters are expected to utilize an intermediate solution in which the analog and digital signals can be transmitted simultaneously within the same licensed band. Such systems are typically referred to as in-band on-channel (IBOC) DAB systems, and are being developed for both the FM and AM radio bands. In order to prevent significant distortion in conventional analog FM receivers, the digital signal in a typical FM-IBOC DAB system is, e.g., transmitted in two sidebands, one on either side of the analog FM host signal.

Despite the above-noted advances in the development of DAB systems for the delivery of CD-quality audio, a given user that may have already listened to a given piece of music several times, e.g., using an FM receiver, is nonetheless required to go through the process of downloading the entire piece over the Internet in order to purchase that piece of music. A need therefore exists for a more efficient process of delivering purchased music and other types of information to authorized users.

SUMMARY OF THE INVENTION

The present invention provides methods and apparatus for delivering and receiving information in digital audio broadcasting (DAB) and other communication system applications. In an illustrative embodiment, audio information is delivered to a user via a multi-stream in-band on-channel (IBOC) DAB system in a partially-encrypted form. The information is encoded and separated into multiple bitstreams, at least a subset of which are left unencrypted. The multiple bitstreams may correspond, e.g., to subbands of at least first and second digital sidebands of a host carrier signal in an FM-IBOC DAB system. Both the encrypted and unencrypted bitstreams are received and stored by the user in a disk, memory card, cartridge or other storage device. For a limited period of time, the user may be permitted to access the information at a first quality level, e.g., to listen to and/or record the information at an FM-quality level, without having the corresponding decryption key, by utilizing only the unencrypted bitstreams.

In order to access the information at a second, higher quality level, e.g., to listen to and/or record the information at a CD-quality level, a user purchases a decryption key for the information from, e.g., an electronic-commerce web site. The key may be downloaded from the site to an information processing device of the user, and may be utilized to decrypt the encrypted bitstreams, such that by utilizing all of the transmitted bitstreams the user is provided with access to the information at the higher quality level. The decryption key may be supplied via a variety of other techniques, e.g., with the transmitted bitstreams in an auxiliary or ancillary data channel, or via a physical device which plugs into a receiver.

In accordance with another aspect of the invention, the above-noted storage device may be adaptable for insertion into both a receiver which receives the multiple bitstreams, and a computer or other information processing device which accesses the web site to obtain the decryption key. In this manner, a user can download the information as transmitted via the DAB system to the storage device, and subsequently use the information processing device to obtain the key.

Advantageously, a system configured in accordance with the invention avoids unnecessary downloading of information already transmitted via broadcast airwaves, while also ensuring that copyright owners and service providers receive appropriate payments. The invention can be applied to other types of digital information, including, e.g., data, video and image information. In addition, the invention may be implemented in numerous applications other than IBOC DAB systems, such as Internet and satellite broadcasting systems, systems for simultaneous delivery of audio and data, etc.

DETAILED DESCRIPTION OF THE INVENTION

Figure 1:
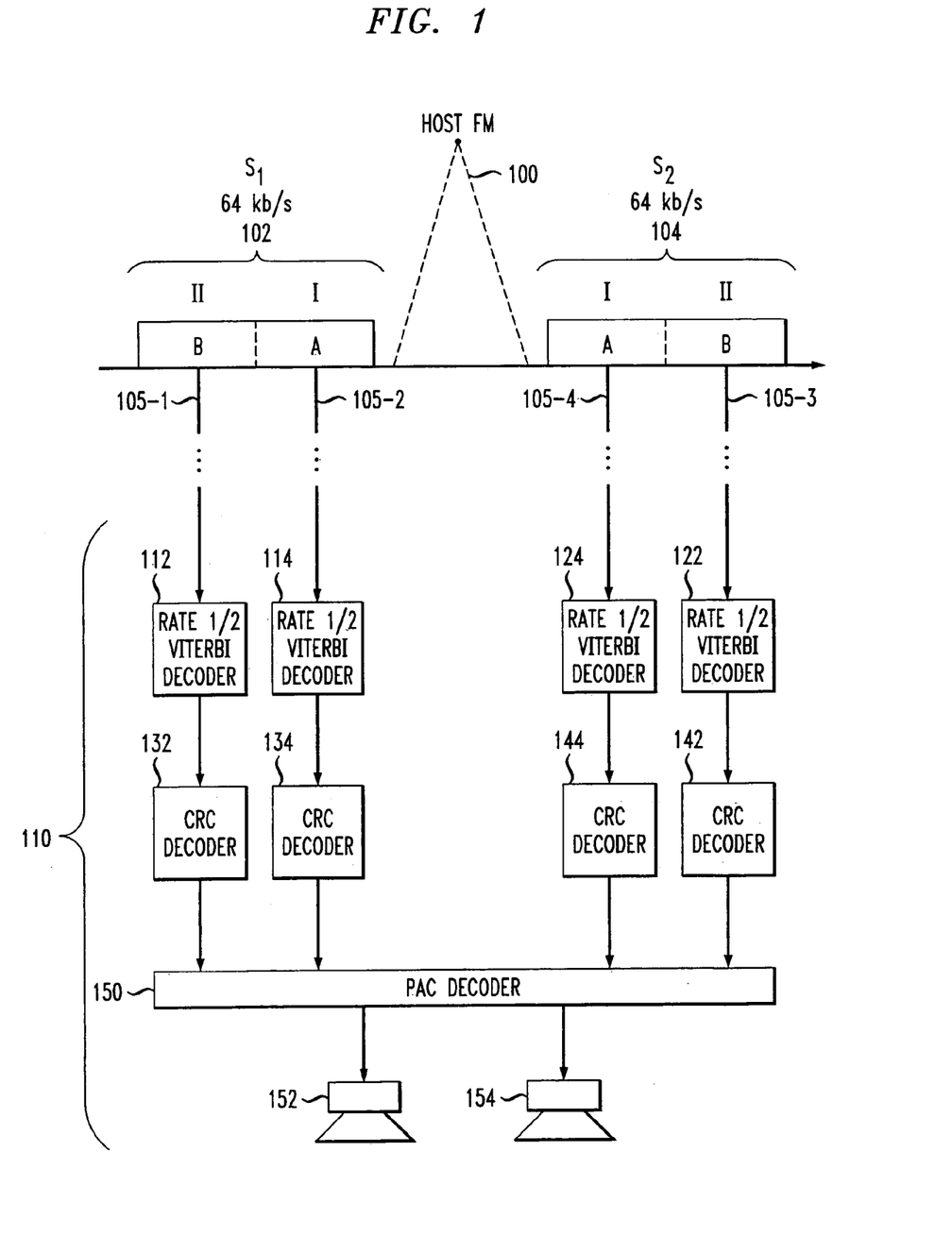
FIG. 1 illustrates the operation of an exemplary FM in-band on-channel (FM-IBOC) digital audio broadcasting (DAB) system in which the invention may be implemented.

FIG. 1 illustrates the operation of an exemplary FM in-band on-channel (FM-IBOC) digital audio broadcasting (DAB) system in which the invention may be implemented. The portion of the spectrum shown includes an analog host FM signal 100 with associated lower digital sideband 102 and upper digital sideband 104. The sidebands represent portions of the frequency spectrum used to transmit digital audio information in the FM-IBOC DAB system. As will be described in greater detail below, the system in the illustrative embodiment uses an overall digital audio source coder rate of 128 kbits per second, multidescriptive coding with two-level unequal error protection (UEP), a rate ½ convolutional code as an inner channel code, a cyclic redundancy code (CRC) as an outer channel code, and differential quadrature phase shift keyed (DQPSK)/orthogonal frequency division multiplexed (OFDM) modulation.

In the exemplary FM-IBOC DAB system of FIG. 1, an audio signal is first encoded using a multidescriptive coding technique to produce two streams $S_1$ and $S_2$ at 64 kbits per second each. The streams $S_1$ and $S_2$ are transmitted on host FM signal 100 as sidebands 102 and 104, respectively. The transmission of multidescriptive streams $S_1$ and $S_2$ in different frequency bands provides both information diversity and frequency diversity.

The two streams $S_1$ and $S_2$ are then each divided into two classes, class I and class II, using a bit stream classifier. Class I bits represent the more important audio bits, and may be provided with a higher level of error protection, e.g., by associating them with innermost subband A, i.e., the subband which is less susceptible to first adjacent channel interference. Class II bits, which have been determined to be of lesser importance to reconstructed audio quality than the class I bits, are provided with a lower level of error protection by associating them with the outermost subband B. Performance gains are obtained from this type of frequency division UEP by exploiting interference variations across the sidebands. Other UEP techniques, e.g., providing a higher transmission power level for the A subbands than for the B subbands, may also be used.

The subbands A and B of each digital sideband 102 and 104 are encoded for transmission using the above-noted rate ½ convolutional inner code and CRC outer code. This arrangement results in a total of four different bitstreams 105-1, 105-2, 105-3 and 105-4.

FIG. 1 also shows a portion of a receiver 110 for decoding the multiple bitstreams of the exemplary FM-IBOC DAB system. The receiver includes rate ½ Viterbi decoders 112, 114 and CRC decoders 132, 134 for use in decoding the respective inner and outer code for stream $S_1$, and rate ½ Viterbi decoders 122, 124 and CRC decoders 142, 144 for use in decoding the respective inner code and outer code for stream $S_2$.

More particularly, in this four-stream implementation, bitstream 105-1 associated with subband B of sideband 102 is decoded in Viterbi decoder 112 and CRC decoder 132, bitstream 105-2 associated with subband A of sideband 102 is decoded in Viterbi decoder 114 and CRC decoder 134, bitstream 105-3 associated with subband B of sideband 104 is decoded in Viterbi decoder 122 and CRC decoder 142, and bitstream 105-4 associated with subband A of sideband 104 is decoded in Viterbi decoder 124 and CRC decoder 144. The outputs of the CRC decoders 132, 134, 142 and 144 are applied to a perceptual audio coder (PAC) decoder 150, which generates reconstructed audio output signals for application to speakers 152, 154. It should be noted that the exemplary systems illustrated in FIG. 1 may be configured to introduce delay between the various multiple bit streams, in order to provide additional time diversity.

In the FIG. 1 system, all four of the bitstreams 105-1, 105-2, 105-3 and 105-4 are generally required in order to reproduce CD-quality audio. In other words, all four of these streams must be received and decoded in order to reconstruct a transmitted audio signal with CD-quality fidelity, i.e., a bandwidth of about 19 kHz and a dynamic range of about 96 dB. Any two of the four bitstreams can be used to reproduce FM-quality audio, which has a significantly lower bandwidth and dynamic range than CD-quality audio, i.e., a bandwidth of about 13 kHz and a dynamic range of about 65 to 70 dB.

Figure 2:
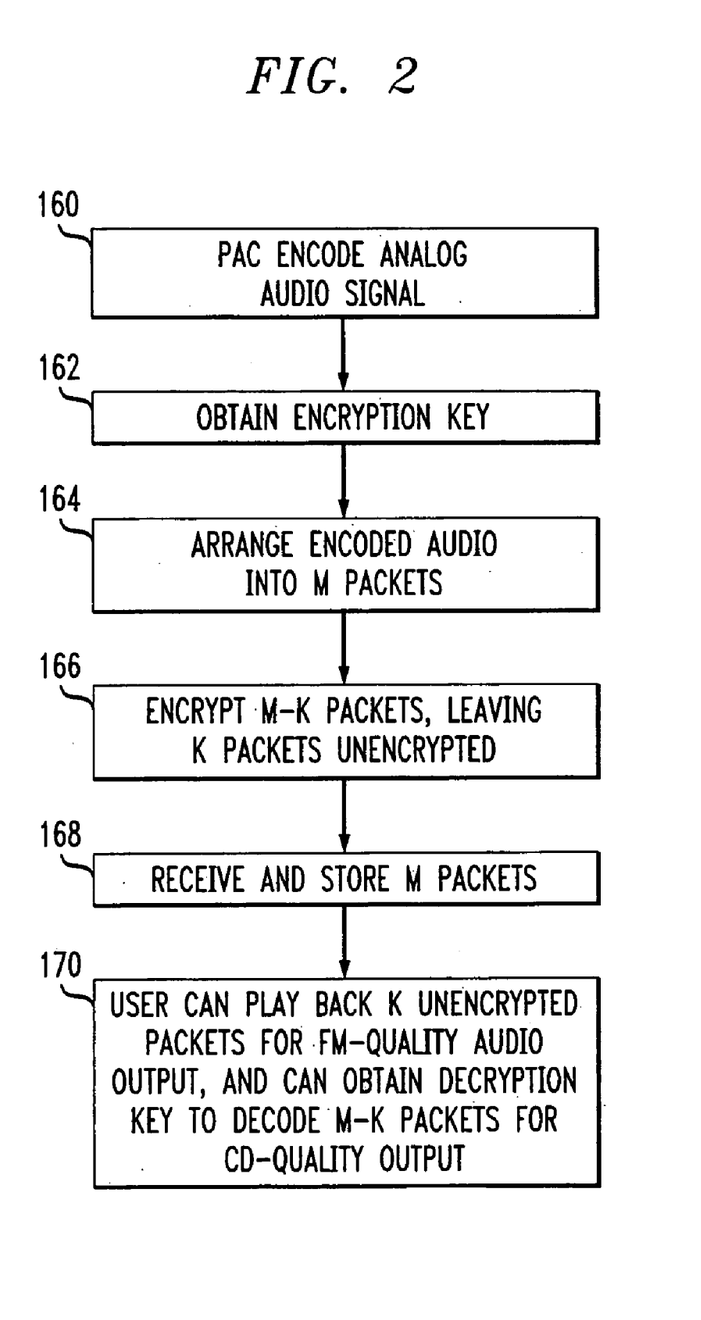
FIG. 2 is a flow diagram of an exemplary audio information transmission technique in accordance with the invention.

FIG. 2 is a flow diagram of an exemplary audio information transmission technique which may be implemented in the above-described FM-IBOC DAB system. This technique is particularly well suited for use in applications in which it is desirable to deliver a piece of music or other type of audio information without charge to a user at a particular quality level, e.g., FM-quality audio, while requiring the user to pay an additional fee for receiving the audio information at a higher quality level, e.g., CD-quality level.

In step 160 of FIG. 2, a designated analog audio signal is encoded using PAC encoding techniques, such as those described in, e.g., D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein. The analog audio signal may correspond to, e.g., a particular song or other piece of music to be broadcast by the system and made available to users at an FM-quality level without additional charge. In step 162, an encryption key is obtained for the encoded analog audio signal. The encoded audio is then arranged into M packets, as indicated in step 164. In step 166, a designated number M–K of the packets are encrypted using the encryption key, while the remaining K packets remain unencrypted. The K unencrypted packets are placed in two of the four bitstreams 105-1, 105-2, 105-3 and 105-4 for transmission to the system users, while the remaining M–K packets are placed in the remaining two bitstreams.

A given user of the system receives and stores all M packets, as indicated in step 168. However, without access to the corresponding decryption key, the user is able to decode and utilize only the K unencrypted packets, and therefore can generate only an FM-quality reconstruction of the transmitted audio signal. In order to generate a CD-quality reconstruction of the original audio signal, the user must obtain the decryption key and decode the remaining M–K packets. As will be described in greater detail below, the user may obtain this decryption key via a network connection established with a server over the Internet or other computer communication network. Advantageously, such an arrangement allows the user to purchase CD-quality audio information that has been previously supplied to them over broadcast airwaves, without requiring the user to download the CD-quality audio from the Internet.

Figure 3:
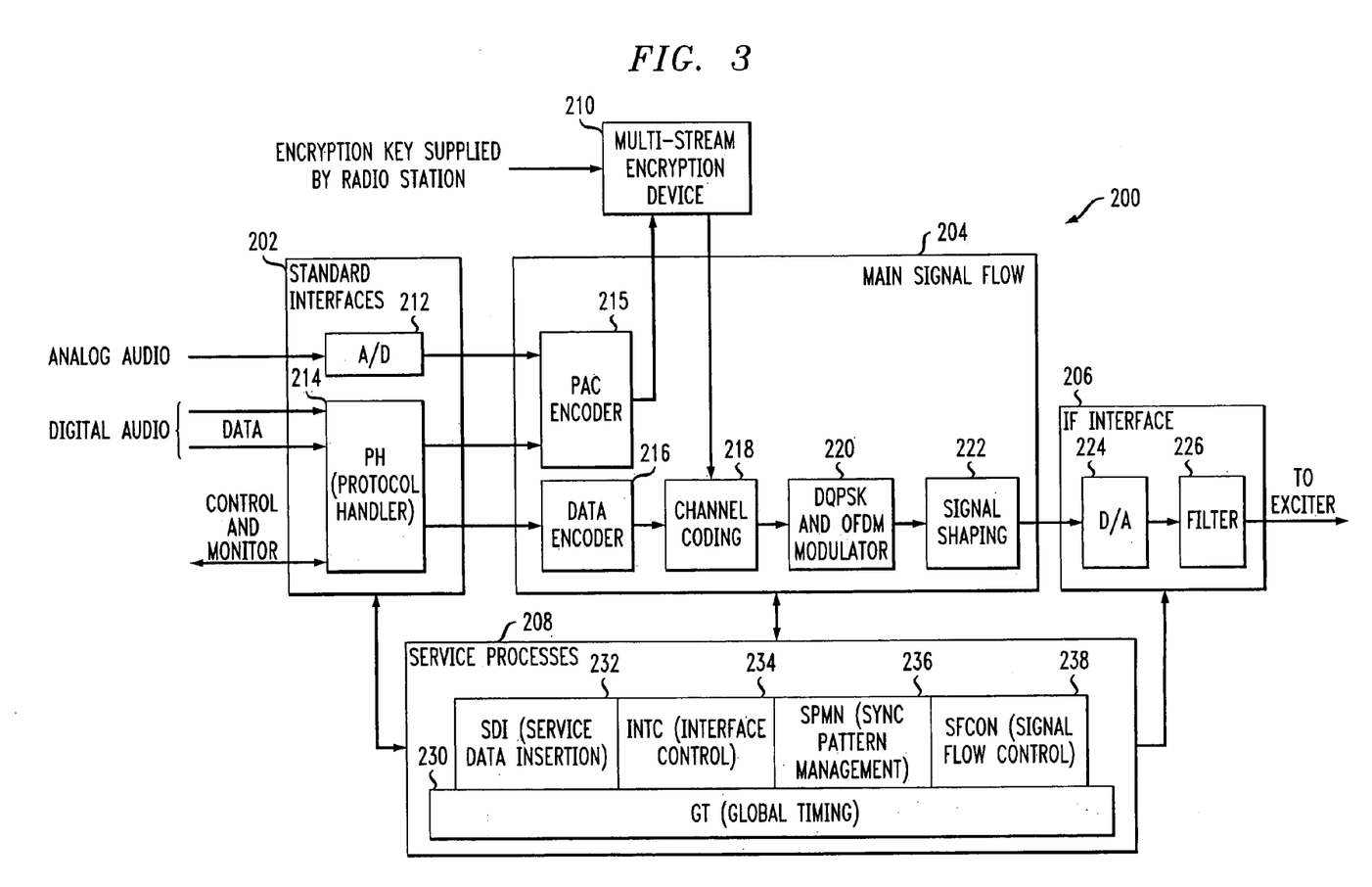
FIGS. 3 and 4 show illustrative embodiments of transmitters for implementing the FIG. 2 audio information transmission in accordance with the invention.

FIG. 3 shows a portion of an exemplary transmitter 200 in accordance with the invention, configured for use in the above-described FM-IBOC DAB system. The transmitter 200 includes a set of standard interfaces 202, a main signal flow block 204, an intermediate frequency (IF) interface 206, and a set of server processes 208. The transmitter 200 also includes a multi-stream encryption device 210.

The standard interfaces 202 include an analog-to-digital (A/D) converter 212 for converting an input analog audio signal to digital form, and a protocol handler (PH) 214 which receives input digital audio data, and delivers control and monitor information, e.g., to other portions of the transmitter or other system devices. A multi-stream PAC audio encoder 215 receives uncompressed digital audio from either the A/D converter 212 or the PH 214, and generates compressed audio bitstreams using the audio compression techniques described in the above-cited D. Sinha et al. reference. Although the output of the PAC encoder 215 is shown as a single line, it should be understood that this output corresponds to multiple parallel bitstreams, e.g., four bitstreams as illustrated in FIG. 1.

The compressed audio output of the multi-stream PAC encoder 215 is applied to the multi-stream encryption device 210, which encrypts a portion of the PAC output using the above-described encryption key. In a typical arrangement, at least about one-half of the multiple bitstreams generated by the PAC encoder 215 will be encrypted. For example, if four streams are generated, e.g., as illustrated in FIG. 1, at least two of the four will be encrypted; if two streams are generated, at least one will be encrypted. The encryption key may be supplied to the encryption device 210 by a radio station or other service provider operating the transmitter 200. An auxiliary data input, not shown in FIG. 3, may be used for supplying the key to the encryption device 210. The encryption key may be periodically repeated, e.g., once per second, so that it is possible for a user to tune a receiver to the corresponding radio station and receive at least FM-quality audio as soon as it becomes available. As previously noted, the receiver will require the corresponding decryption key in order to decode all of the bitstreams to obtain CD-quality audio. It is preferred that the particular encryption process used provide a level of security comparable to that provided by conventional 128-bit encryption commonly utilized in electronic commerce applications, although other types of encryption could also be used.

The output bitstreams from the PAC encoder 215 may be framed in packets that also contain information about the date, time, radio station or other service provider source, music selection, artist, etc. A portion of that data may be obtained, e.g., from a compact disk digital audio (CDDA) file on a corresponding CD, if applicable. As described above in conjunction with the flow diagram of FIG. 2, the total compressed audio information for a given piece of music or other audio information to be transmitted may be arranged in the form of a total of M packets distributed over the multiple bitstreams, with M–K of the packets encrypted, and the remaining packets left unencrypted.

The output of the multi-stream encryption device 210 is applied, along with any encoded data from a data encoder 216, to a channel coding block 218. The channel coding block provides forward error correction (FEC), e.g., using the above-noted CRC and convolutional coding. Each of the separate parallel bitstreams generated by the multi-stream PAC encoder 215 may be subject to separate CRC and convolutional coding operations. The output of the channel coding block 218 is applied to a DQPSK/OFDM modulator 220, and then to a signal shaping block 222. The resulting output is processed in a digital-to-analog (D/A) converter 224 and a filter 226 in the IF interface 206, and then delivered to an exciter portion (not shown) of the transmitter which implements conventional operations such as upconversion, filtering and high-power amplification, prior to being transmitted over a broadcast medium.

The service processes 208 of the transmitter 200 include global timing (GT) 230, service data insertion (SDI) 232, interface control (INTC) 234, sync pattern management (SPMN) 236, and signal flow control (SFCON) 238. Each of these elements communicates with one or more of the standard interfaces 202, the main signal flow block 204, and the IF interface 206.

One or more of the service processes 208, as well as other elements of the transmitter 200, may be implemented at least in part using a digital signal processor, application-specific integrated circuit (ASIC), field-programmable gate array (FPGA) circuit, as well as portions or combinations of these and other processors.

Figure 4:
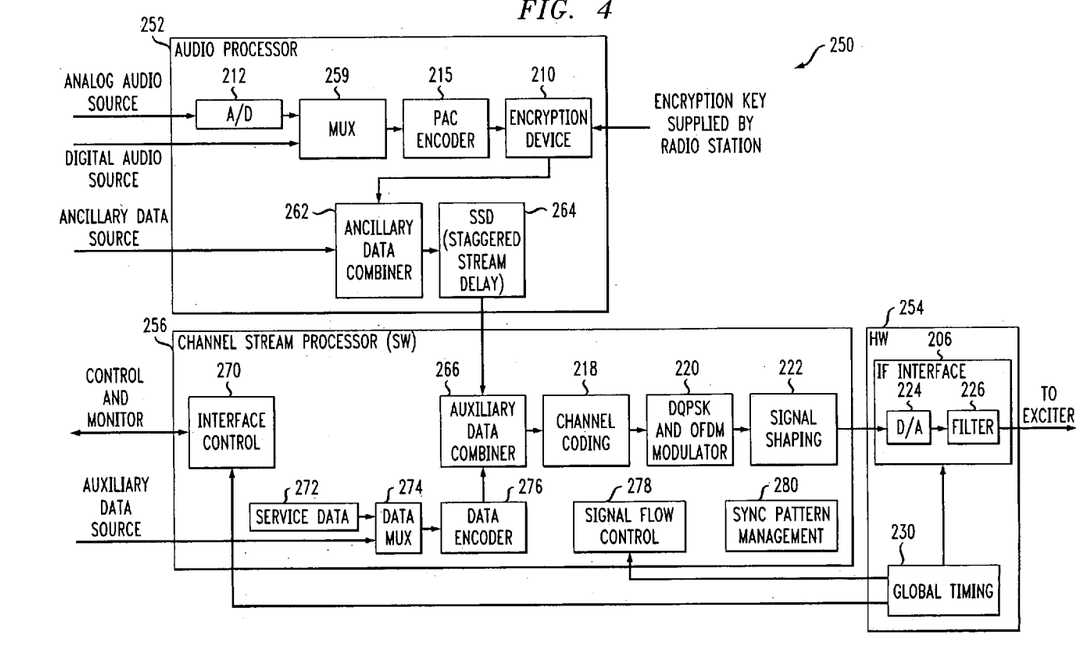

FIG. 4 shows a portion of a transmitter 250 which represents an alternative implementation of the transmitter 200 of FIG. 3. The transmitter 250 includes an audio processor 252, a channel stream processor 256, and a set of hardware 254 which implements the IF interface 206 and the global timing process 230. In the audio processor 252, an analog audio source is applied to A/D converter 212, and multiplexed with a digital audio source in a multiplexer 259. An output of the multiplexer 259 is applied to the above-described multi-stream PAC encoder 215, and the multi-stream output of the PAC encoder 215 is partially encrypted in the encryption device 210 in the manner previously described. The encryption device 210 in this embodiment is assumed to be part of the audio processor 252. The output of the encryption device is applied to an ancillary data combiner 262, and combined with data from an ancillary data source, if any. Different delays may be applied to one or more of the multiple bitstreams in a staggered stream delay (SSD) element 264, in order to provide the above-noted time diversity between the bitstreams.

The channel stream processor 256, which may be implemented in whole or in part in software, includes an auxiliary data combiner 266 which receives the multiple bitstreams from the SSD element 264. The auxiliary data combiner 266 combines the multiple streams with auxiliary data from an auxiliary data source and service data 272, as delivered from a data multiplexer 274 and data encoder 276. Data encoder 276 may be, e.g., a Reed-Solomon (RS) encoder. An interface control element 270 interacts with the global timing process 230 to handle the transfer of control and monitor information between the channel stream processor 256 and, e.g., other portions of the transmitter or other system devices.

The output of the auxiliary data combiner 266 is encoded in channel coding block 218, and the resulting bitstreams are processed through DQPSK/OFDM modulator 220 and signal shaping block 222. The output of the signal shaping block is then applied to the IF interface 206, which as previously noted includes D/A converter 224 followed by filter 226. The output of the IF interface 206 is then delivered to the above-noted exciter portion of the transmitter for transmission over a broadcast medium.

Figure 5:
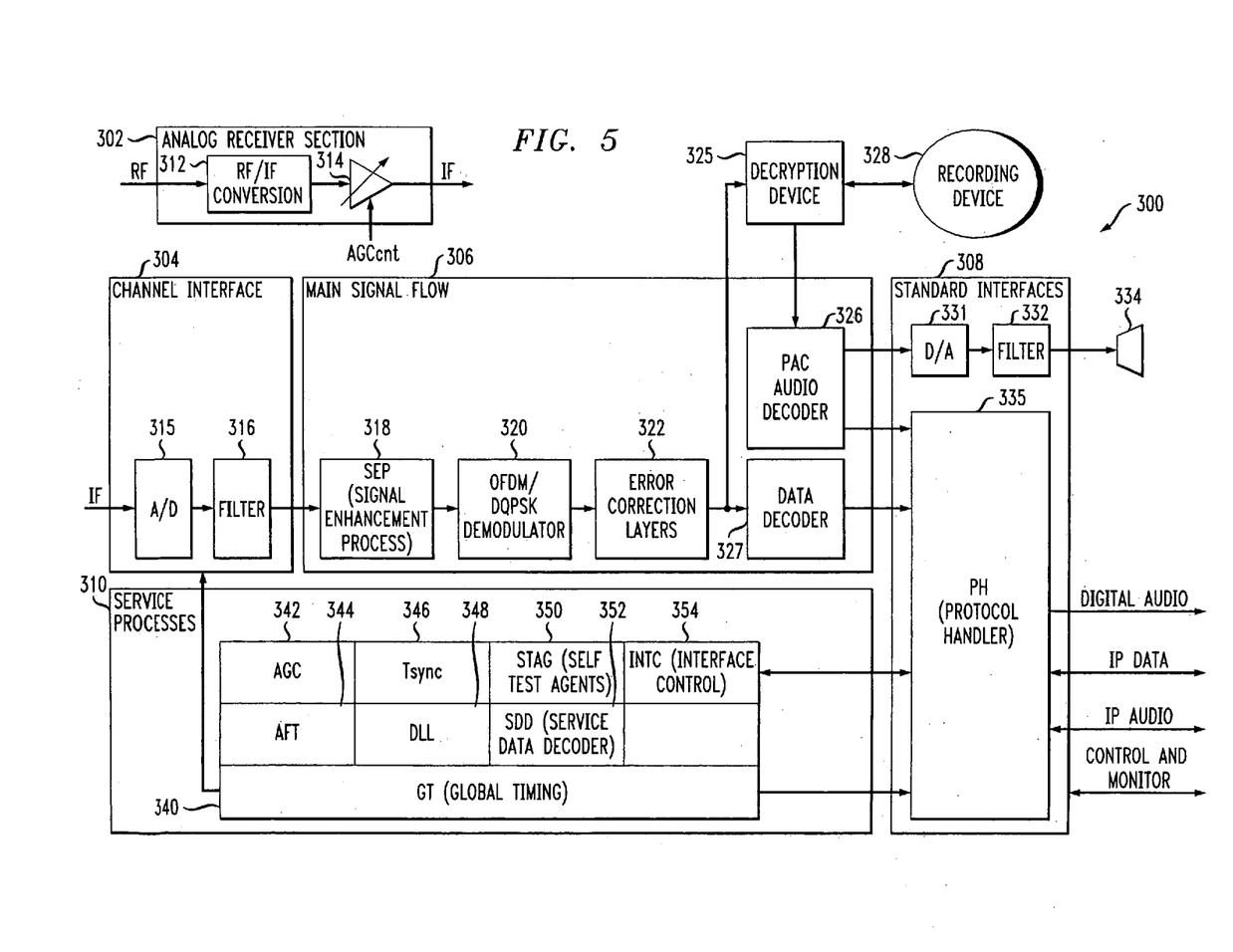
FIG. 5 shows an illustrative embodiment of a receiver for use in receiving audio information in accordance with the invention.

FIG. 5 shows a portion of an exemplary receiver 300 in accordance with the invention, configured for use in the above-described FM-IBOC DAB system. The receiver 300 includes an analog receiver section 302, a channel interface 304, a main signal flow block 306, a set of standard interfaces 308, and a set of service processes 310. The analog receiver section 302 receives an RF input signal from an antenna, which is not shown, and processes the RF input signal through an RF/IF converter 312 and an automatic gain control (AGC) amplifier 314 to generate an IF output signal.

The IF signal is processed through an A/D converter 315 and filter 316 of channel interface 304, and then applied to the main signal flow block 306.

In the main signal flow block 306, the bitstreams are processed through a signal enhancement process (SEP), an OFDM/DQPSK demodulator 320, and one or more error correction layers 322. The error correction layers 322 provide the decoding of the above-noted CRC and convolutional codes. For example, the outputs of the error correction layers 322 may correspond to the four outputs of the CRC decoders 132, 134, 142 and 144 of FIG. 1. The encrypted audio portions of these outputs are applied to a multi-stream decryption device 325 and a multi-stream PAC audio decoder 326, while the data portions are applied to a data decoder 327. The output of the decryption device 325 is applied to a recording device 328.

The unencrypted portions of the output of the PAC audio decoder 326 are applied directly to a D/A converter 331 and filter 332 in the standard interfaces 308. The output of the filter 332 is applied to a speaker 334, which generates an FM-quality audio output using the unencrypted portions of the PAC audio decoder output. The unencrypted portions of the PAC audio decoder 326 are also applied, along with the outputs of the data decoder 327, to a PH 335 in the standard interfaces 308. The PH 335 provides a digital audio output, Internet protocol (IP) data and audio interfaces, and handles the transfer of control and monitor information.

The service processes 310 of the receiver 300 include GT 340, AGC 342, automatic frequency tracking (AFT) 344, synchronization timing (Tsync) 346, digital local loop (DLL) 348, self-test agents (STAG) 350, service data decoder (SDD) 352, and INTC 354. Each of these elements communicates with one or more of the channel interface 304, the main signal flow block 306, the standard interfaces 308, and the service processes 310.

One or more of the service processes 310, as well as other elements of the receiver 300, may be implemented at least in part using a digital signal processor, an ASIC, an FPGA, as well as portions or combinations of these and other types of processors. For example, the decryption device 325, the PAC audio decoder 326, the data decoder 327, and an interface to the recording device 328, may be implemented at least in part using a DSP, while the SEP 318, OFDM/DQPSK demodulator 320, error correction layers 322, and PH 335, may be implemented in a combination of an ASIC and an FPGA. More particularly, implementing the decryption device 325 and recording device interface as DSP code in a read-only memory (ROM) of a DSP ensures that these elements will be less susceptible to unauthorized access after manufacture.

In the receiver 300, the additional data transmitted with a particular piece of music or other audio information is used to uniquely identify that information by author, source, date, time, etc. The decryption device 325 directs the recording of the received bitstreams, along with the additional data, in the recording device 328. The recording device 328 may store the audio information and other related information, such as information regarding bit error rate, in a file-like structure on a non-volatile data storage device or cartridge such as a flash memory card, PCMCIA card, ZIP disk, floppy disk, hard drive, etc. For example, a typical 100 Mbyte ZIP cartridge may be used to store approximately 100 minutes of compressed audio at 16 kbytes per second (128 kbits per second), or a typical 48 Mbyte flash memory cartridge may be used to store approximately 50 minutes of compressed audio at 16 kbytes per second. It should be emphasized that these are examples only, and the invention does not require any particular type of storage device.

The recording device 328 may be part of or otherwise associated with a computer, personal digital assistant (PDA) or other information processing device which is separate from the receiver 300. For example, the above-noted non-volatile storage device may be an element of a computer or other information processing device which communicates with the receiver via an appropriately-configured communication port.

In the illustrative embodiment, pieces of music or other audio information are generally not automatically recorded. They are instead typically recorded as a result of an action taken by the user to request that a particular selection be recorded. The oldest recorded audio selection may be overwritten after issuance of an appropriate warning if there is not enough room in the non-volatile storage device to store the entire current selection.

The received information is typically recorded in its previously-described encrypted form, assuming that the user has not yet obtained a corresponding decryption key. Until such time that the user obtains the decryption key, in the manner to be described below, a given recorded audio selection can only be played at an FM-quality level. When the user wants to listen to a particular recorded selection from the non-volatile storage device, the user can choose playback of that selection via an appropriate user interface, and it will be played through the receiver at the reduced quality level, e.g., an FM quality level, until such time as an embedded time stamp expires or the corresponding file is overwritten. The multi-stream PAC decoder 326 in the receiver will thus be capable of playing a stored audio selection, but it will perform as if only the unencrypted bitstreams are present, i.e., it will ignore the encrypted portions. If the user has already obtained the decryption key, the received information may be stored in recording device 328 in the form of fully-decrypted CD-quality audio selection.

The encrypted recording generally cannot be read by a computer or other PAC player until it is unlocked by purchasing and processing the corresponding decryption key. Once unlocked, the selection may be played by any PAC player including the receiver 300. The decryption device 325 and recording device interface have access to all of the data necessary to tag, record and reproduce a given audio selection. When a purchased and decrypted audio selection is chosen by the user, the receiver will play the selection at a CD-quality level using the PAC audio decoder 326, D/A 331, filter 332 and speaker 334.

Figure 6:
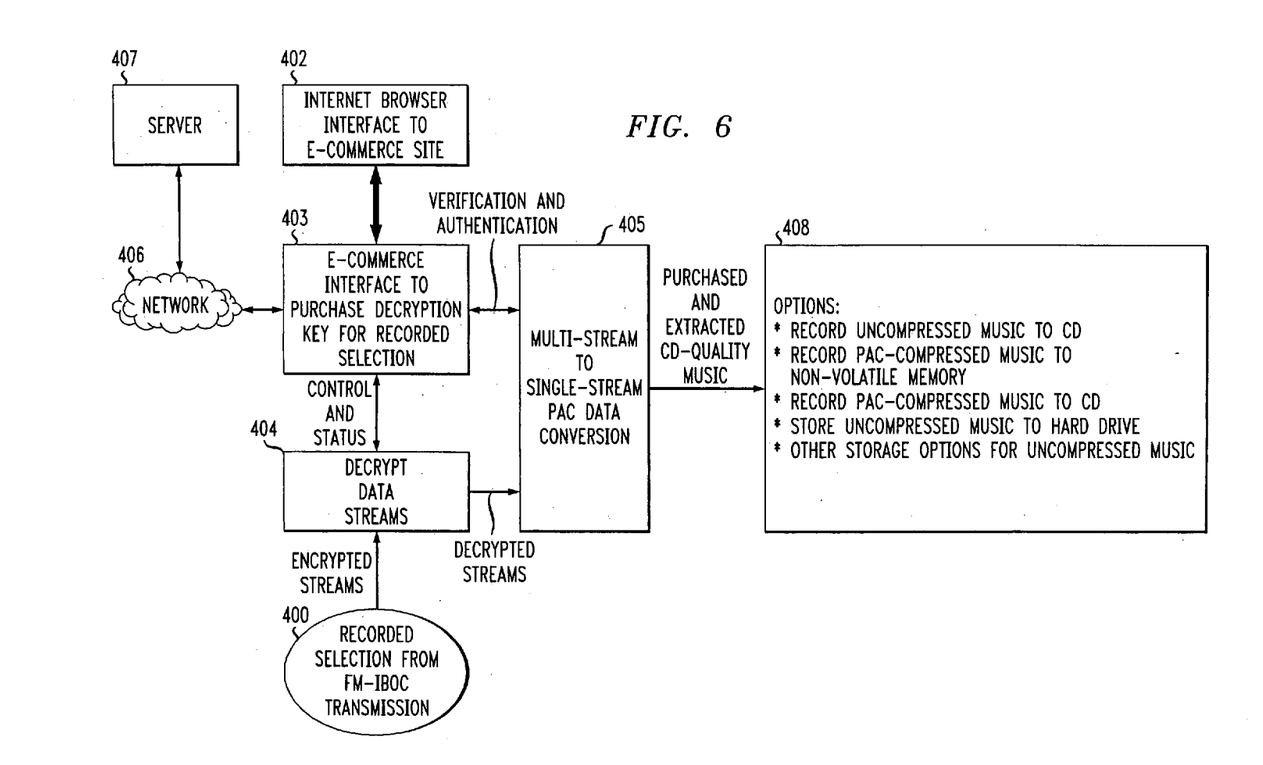
FIG. 6 illustrates the manner in which a decryption key for use in decrypting received audio information is obtained over the Internet in accordance with the invention.

FIG. 6 illustrates the manner in which a particular recorded audio selection 400 may be purchased by a user over a computer network such as the Internet. As previously noted, audio selections that were chosen by the user to be recorded in the non-volatile storage device may be converted to full CD-quality audio, e.g., by purchasing the decryption key over the Internet and running an appropriate conversion program. The user is assumed to be equipped with a computer, PDA or other suitable information processing device which includes an Internet browser 402 for interfacing to an electronic-commerce (e-commerce) web site. The information processing device may be configured to run the above-noted conversion program. The web site includes an e-commerce interface 403 for permitting the user to purchase the decryption key for a given recorded audio selection. The conversion program may also be downloaded to the information processing device from the e-commerce web site via the interface 403, e.g., as part of a first purchase, or is otherwise purchased or obtained by the user. Such a program or portions thereof could also be incorporated into the receiver.

The conversion program interacts with the recording device 328 of receiver 300 to access the recorded selection 400. The encrypted bitstreams are then subject to a decryption operation 404 and a multi-stream to single-stream PAC data conversion operation 405. The decryption operation 404 is carried out in the decryption device 325 of receiver 300, using the decryption key purchased by the user over the Internet. The decryption operation 404 could alternatively be carried out in whole or in part in the above-noted information processing device. The decrypted bitstreams are processed in the conversion operation 405 using the PAC audio decoder 326.

The e-commerce interface 403 and the corresponding decryption key supplied therethrough may be provided to the user via a connection established over a network 406 with a server 407 in a well-known conventional manner, e.g., using transmission control protocol/Internet protocol (TCP/IP) techniques.

The resulting CD-quality audio selection can be processed using any of a number of different options 408, such as, e.g., recording or otherwise storing the CD-quality audio selection in uncompressed or PAC-compressed form on a recordable CD, hard disk or other non-volatile storage medium.

A more detailed example of the processing operations illustrated in FIG. 6 is as follows. Assume that the user has chosen several audio selections and wishes to purchase them. The selections are stored on a non-volatile storage cartridge, a ZIP disk or flash memory card, with several additional selections that will not be purchased. The user logs onto the Internet using a personal computer and selects the appropriate e-commerce web site for the purchase. The user inserts the cartridge into an adapter appropriate to the cartridge type, e.g., a ZIP drive or flash memory card slot on the personal computer, and the web site automatically scans the cartridge for contents.

The web site presents the user with a list of the selections available in the cartridge. The user chooses the desired selections and enters appropriate credit card information. When the credit is approved, the web site downloads the decryption key for each chosen selection and stores it in both on the cartridge and on hard drive of the personal computer. This reduces the chance that a particular decryption key will be lost or corrupted when the audio is decompressed and converted to a different format. The keys may be configured such that they are valid only for a limited period of time, using known techniques.

The web site uses the information linked to the selection to identify it by artist, author, publisher, radio station source, date and time, and to determine the appropriate key. This information may also be used to distribute appropriate payments to the copyright owners and radio stations, and can also be used to determine demographic information such as statistics for the selections, user listening habits, etc.

After the key for a given selection is downloaded, the web site checks and verifies that the selections are complete and without errors. It may use the auxiliary information recorded with the selection to verify that the complete selection is available without errors once it is unlocked. If the selection is not verified as error-free, then the web site may notify the user of the flaws and gives the user the option to download a complete compressed file instead of decrypting the selection on the storage device. If the user chooses not to download the compressed file, the web site will credit the account and the selection will not be purchased. The usual scenario will be to download the keys, verify the selections and allow the user to continue with other things and not have to wait for any files to download. This is a significant advantage to conventional Internet-based download of musical selections, e.g., via MP3.

The decrypting and conversion operations on the audio selections may be done in the background or off-line. The user is given choices as to how the music is to be stored after the processing is completed. Typical choices in the present example would be, e.g., leave the selection compressed in single-stream PAC format and store it on the personal computer hard drive, cartridge or other storage device, or decompress the selection and store it on the personal computer hard drive or record it as a CD-quality track on a recordable CD. In any case, the user is provided with a single CD-quality copy of the selection. The selection may be played back through the receiver 300, or using another suitable playback device.

Figure 7:
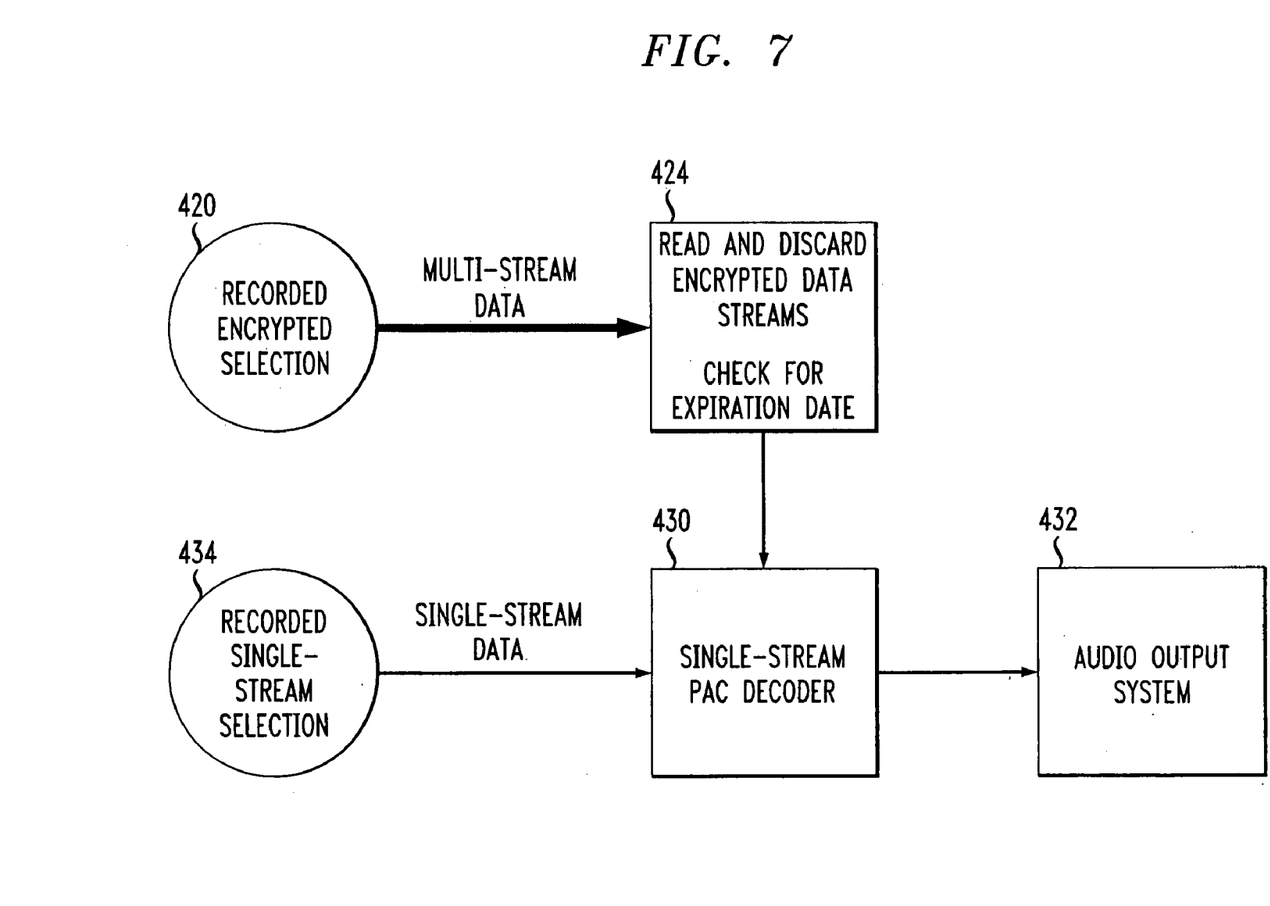
FIG. 7 illustrates the manner in which audio information obtained through a DAB system may be played back in accordance with the invention.

FIG. 7 illustrates examples of the manner in which a given recorded audio selection may be played back. A given recorded encrypted selection 420 may be played back for a designated period of time, e.g., 30 days, at a reduced quality level prior to purchase. This allows the user ample time to decide whether to purchase the recorded audio selection or to discard it. The recorded encrypted selection may be read in operation 424, which discards the encrypted streams and checks the corresponding expiration date. The selection is then applied to a single-stream PAC decoder 430 for playback through an audio output system 430 at, e.g., an FM-quality level.

The single-stream PAC decoder 430 may represent, e.g., a portion of the PAC audio decoder 326 of FIG. 5 or a PAC decoder of a separate playback device, and the audio output system 432 may represent, e.g., elements 331,332 and 334 of FIG. 5. The single-stream PAC decoder 430 could also be replaced with a multi-stream PAC decoder. Once the selection is purchased, it may be recorded as a single-stream CD-quality selection 434, as previously described, and then played back through the PAC decoder 430 and audio output system 432.

Alternative embodiments of the invention could provide a user with the decryption key using techniques other than those described above. For example, the decryption key may be sent by the transmitter to the receiver as part of the original transmitted signal, e.g., as part of an auxiliary or ancillary data channel. Alternatively, the decryption key may be supplied by a physical device that plugs into the receiver. The implementation details of such decryption arrangements are well understood in the art, and therefore not described in detail herein. In such arrangements, although a given user may be permitted to listen to CD-quality audio using the transmitted decryption key, such a user may be, e.g., prevented from recording the CD-quality audio until it is purchased and the receiver is provided with information indicating that the purchase is complete.

It should be noted that the above-described embodiments of the invention are illustrative only. For example, the invention can be used with other types of information, e.g., video or image information, data, etc., and with other types of communication systems, such as satellite based systems, Internet-based broadcasting systems, cable networks, etc. For example, although the quality available from a conventional AM-IBOC system is generally not sufficient for delivering CD-quality audio, such a system may utilize the techniques of the invention to deliver other types of information. In addition, the invention may be used with any desired type of encryption and decryption process. Further-more, a variety of different electronic commerce techniques and configurations may be used allow users to purchase access to information previously downloaded via radio broadcast channel or other communication medium in accordance with the invention. These and numerous other alternative embodiments and implementations within the scope of the following claims will be apparent to those skilled in the art.

What is claimed is:

1. A method of delivering information, the method comprising the step of:
    delivering at least a portion of the information to a receiver in an at least partially-encrypted format using multiple bitstreams of a digital communication system, such that access to the information is provided at a first quality level;
    wherein the multiple bitstreams are transmitted in subbands of one or more digital sidebands of a carrier signal in the system; and
    wherein upon decryption of the at least partially-encrypted format, access to the information is provided at another quality level.

2. The method of claim 1 wherein access to the information is provided at the first quality level without decrypting the information in the at least partially-encrypted format.

3. The method of claim 1 further including the step of providing a key for decrypting the information in the at least partially-encrypted format, such that when the information is decrypted, access to the information is provided at a second quality level higher than the first quality level.

4. The method of claim 3 wherein the key for decrypting the information in the at least partially-encrypted format is supplied over a network connection established with a server.

5. The method of claim 1 wherein the multiple bitstreams correspond to subbands of at least first and second digital sidebands of a host carrier signal in an in-band on-channel (IBOC) digital audio broadcasting system.

6. The method of claim 5 wherein the host carrier signal is an analog FM host signal.

7. The method of claim 1 wherein the information delivered to the receiver comprises audio information.

8. The method of claim 7 wherein the audio information comprises a particular music selection.

9. The method of claim 7 wherein the first quality level of the audio information corresponds to an FM-quality level, and a second quality level of the audio information corresponds to a CD-quality level.

10. The method of claim 1 wherein at least a subset of the multiple bitstreams are unencrypted, and the information at the first quality level is generated using only the unencrypted bitstreams.

11. The method of claim 1 further including the step of storing the information in the at least partially-encrypted format in a storage device accessible to the receiver.

12. The method of claim 11 wherein the storage device comprises at least one of a disk, a memory card and a cartridge.

13. The method of claim 11 wherein the storage device is associated with an information processing device which establishes a network connection with a server.

14. The method of claim 11 wherein the storage device is adaptable for insertion into (i) a corresponding receptacle of the receiver, and (ii) a corresponding receptacle of an information processing device which establishes a network connection with a server for obtaining a decryption key for decrypting the information in the at least partially-encrypted format.

15. An apparatus for delivering information, comprising:
    a transmitter operative to transmit at least a portion of the information to a receiver in an at least partially-encrypted format using multiple bitstreams of a digital communication system, such that access to the information is provided at a first quality level;
    wherein the multiple bitstreams are transmitted in subbands of one or more digital sidebands of a carrier signal in the system; and
    wherein upon decryption of the at least partially-encrypted format, access to the information is provided at another quality level.

16. The apparatus of claim 15 wherein access to the information is provided at the first quality level without decrypting the information in the at least partially-encrypted format.

17. The apparatus of claim 15 wherein a key is provided for decrypting the information in the at least partially-encrypted format, such that when the information is decrypted, access to the information is provided at a second quality level higher than the first quality level.

18. The apparatus of claim 17 wherein the key for decrypting the at least partially-encrypted format is supplied over a network connection established with a server.

19. The apparatus of claim 15 wherein the multiple bitstreams correspond to subbands of at least first and second digital sidebands of a host carrier signal in an in-band on-channel (IBOC) digital audio broadcasting system.

20. The apparatus of claim 19 wherein the host carrier signal is an analog FM host signal.

21. The apparatus of claim 15 wherein the information delivered to the receiver comprises audio information.

22. The apparatus of claim 21 wherein the audio information comprises a particular music selection.

23. The apparatus of claim 21 wherein the first quality level of the audio information corresponds to an FM-quality level, and a second quality level of the audio information corresponds to a CD-quality level.

24. The apparatus of claim 15 wherein at least a subset of the multiple bitstreams are unencrypted, and the information at the first quality level is generated using only the unencrypted bitstreams.

25. The apparatus of claim 15 wherein the information in the at least partially-encrypted format is stored in a storage device accessible to the receiver.

26. The apparatus of claim 25 wherein the storage device comprises at least one of a disk, a memory card and a cartridge.

27. The apparatus of claim 25 wherein the storage device is associated with an information processing device which establishes a network connection with a server.

28. The apparatus of claim 25 wherein the storage device is adaptable for insertion into (i) a corresponding receptacle of the receiver, and (ii) a corresponding receptacle of an information processing device which establishes a network connection with a server for obtaining a decryption key for decrypting the information in the at least partially-encrypted format.

29. A method of receiving information, the method comprising the steps of:
    receiving at least a portion of the information from a transmitter in an at least partially-encrypted format using multiple bitstreams of a digital communication system, such that access to the information is provided at a first quality level;

wherein the multiple bitstreams are transmitted in subbands of one or more digital sidebands of a carrier signal in the system; and wherein upon decryption of the at least partially-encrypted format, access to the information is provided at another quality level.

30. The method of claim 29 wherein access to the information is provided at the first quality level without decrypting the information in the at least partially-encrypted format, the method further including the step of providing a key for decrypting the information in the at least partially-encrypted format, such that when the information is decrypted, access to the information is provided at a second quality level higher than the first quality level.

31. An apparatus for receiving information, comprising:
a receiver operative to receive at least a portion of the information from a transmitter in an at least partially-encrypted format using multiple bitstreams of a digital communication system, such that access to the information is provided at a first quality level;

wherein the multiple bitstreams are transmitted in subbands of one or more digital sidebands of a carrier signal in the system; and wherein upon decryption of the at least partially-encrypted format, access to the information is provided at another quality level.

32. The apparatus of claim 31 wherein access to the information is provided at the first quality level without decrypting the information in the at least partially-encrypted format, and further wherein a key is provided for decrypting the information in the at least partially-encrypted format, such that when the information is decrypted, access to the information is provided at a second quality level higher than the first quality level.

33. A method of delivering information, the method comprising the step of:
delivering at least a portion of the information to a receiver, using at least first and second bitstreams of a digital communication system, wherein the first bitstream is encrypted and the second bitstream is unencrypted, such that access to the information is provided at a first quality level;

wherein the first and second bitstreams are transmitted in subbands of one or more digital sidebands of a carrier signal in the system; and wherein upon decryption of the first bitstream, access to the information is provided at another quality level.

34. An apparatus for delivering information, comprising:

a transmitter operative to transmit at least a portion of the information to a receiver, using at least first and second bitstreams of a digital communication system, wherein the first bitstream is encrypted and the second bitstream is unencrypted, such that access to the information is provided at a first quality level;

wherein the first and second bitstreams are transmitted in subbands of one or more digital sidebands of a carrier signal in the system; and wherein upon decryption of the first bitstream, access to the information is provided at another quality level.

35. A method of delivering information, the method comprising the steps of:
delivering at least a portion of the information to a receiver in an at least partially-encrypted format using multiple bitstreams of a digital communication system, such that access to the information is provided at a first quality level without decrypting the information in the at least partially-encrypted format; and providing via an electronic commerce system a key for decrypting the information in the at least partially-encrypted format, such that when the information is decrypted, access to the information is provided at a second quality level higher than the first quality level;

wherein the multiple bitstreams are transmitted in subbands of one or more digital sidebands of a carrier signal in the system.

36. The method of claim 35 wherein the electronic commerce system comprises a web site from which the key is downloaded to an information processing device.

37. An apparatus for delivering information, comprising:
a transmitter operative to transmit at least a portion of the information to a receiver in an at least partially-encrypted format using multiple bitstreams of a digital communication system, such that access to the information is provided at a first quality level without decrypting the information in the at least partially-encrypted format, and wherein a key for decrypting the information in the at least partially-encrypted format is provided via an electronic commerce system, such that when the information is decrypted, access to the information is provided at a second quality level higher than the first quality level;

wherein the multiple bitstreams are transmitted in subbands of one or more digital sidebands of a carrier signal in the system.

38. The apparatus of claim 37 wherein the electronic commerce system comprises a web site from which the key is downloaded to an information processing device.

* * * * *